United States Patent [19]

Shannon et al.

[11] Patent Number: 4,516,124
[45] Date of Patent: May 7, 1985

[54] CONVERTIBLE AMPHIBIOUS AIRCRAFT WHEEL POSITION WARNING SYSTEM

[75] Inventors: Harry D. Shannon, 105 Westwood Dr., Houma, La. 70360; William P. Lutts, Richardson, Tex.

[73] Assignee: Harry D. Shannon, Houma, La.

[21] Appl. No.: 400,973

[22] Filed: Jul. 22, 1982

[51] Int. Cl.³ .............................................. G08G 5/00
[52] U.S. Cl. ................... 340/960; 73/178 T; 244/101; 244/105
[58] Field of Search .............. 73/178 T; 244/105–107, 244/101; 340/959, 960; 364/427, 428

[56] References Cited

U.S. PATENT DOCUMENTS

| | | |
|---|---|---|
| 2,116,960 | 5/1938 | Brown .................................. 340/960 |
| 2,262,756 | 11/1941 | Clexton . |
| 2,292,392 | 8/1942 | Miller . |
| 2,420,066 | 5/1947 | Conway . |
| 2,738,490 | 3/1936 | Mihalakis . |
| 3,017,609 | 1/1962 | Ritchie . |
| 3,134,088 | 5/1964 | Sarver ................................. 340/960 |
| 3,161,852 | 12/1964 | Timm . |
| 4,319,218 | 3/1982 | Bateman ............................. 340/960 |

Primary Examiner—James J. Groody
Assistant Examiner—Michael F. Heim
Attorney, Agent, or Firm—Pravel, Gambrell, Hewitt & Kimball

[57] ABSTRACT

An apparatus is provided for an amphibious aircraft which also has retractable landing gear. The apparatus senses changes in aircraft speed indicative of an imminent landing or a takeoff and prompts the pilot to verify that the landing gear is in a position compatible with the type of surface, land or water, chosen for landing.

11 Claims, 3 Drawing Figures

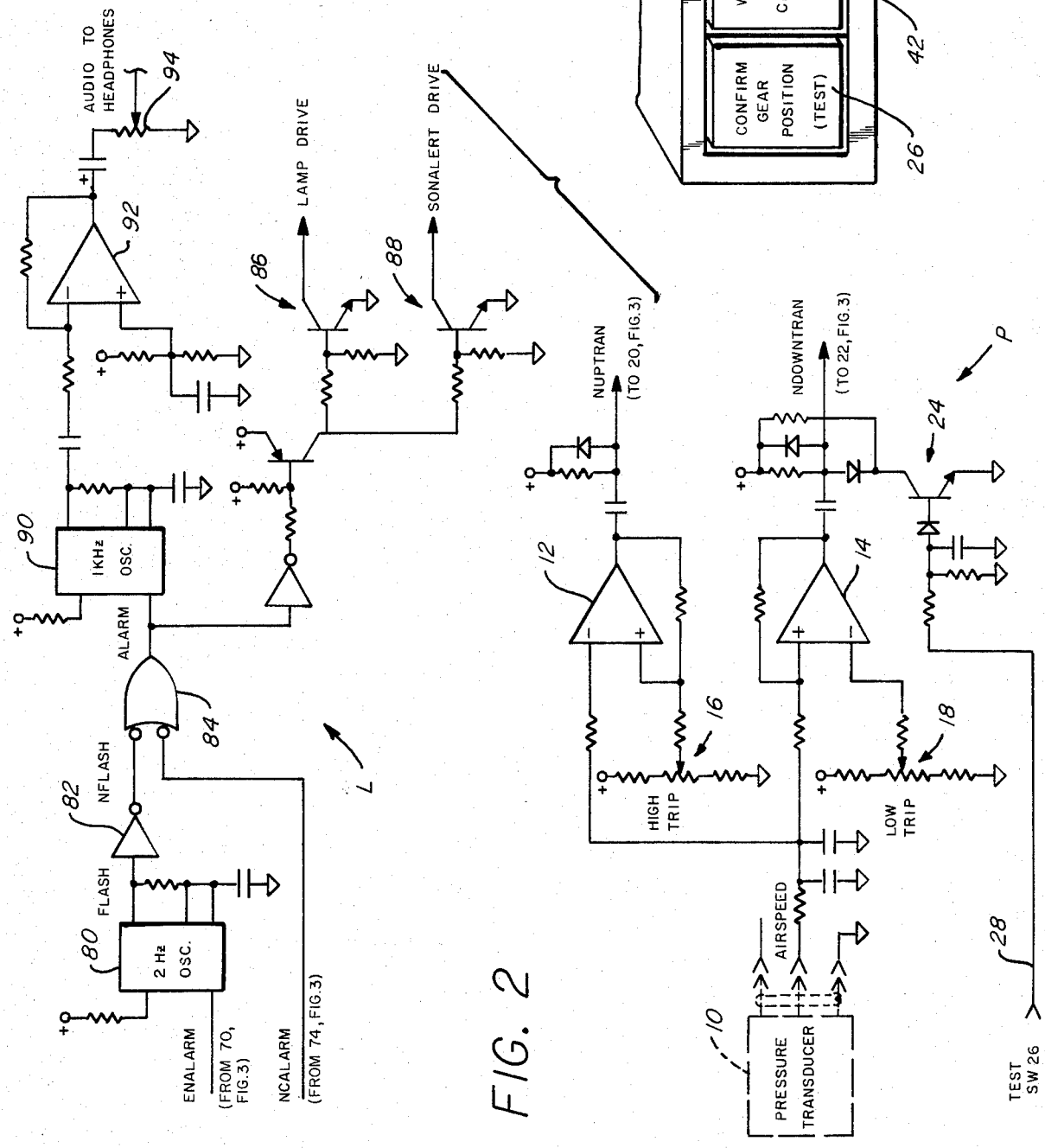

CONVERTIBLE AMPHIBIOUS AIRCRAFT WHEEL POSITION WARNING SYSTEM

TECHNICAL FIELD OF THE INVENTION

1. Field of the Invention

The present invention relates to alert warning systems for amphibious aircraft which also have retractable landing gear for land-based runway operations.

2. Description of the Prior Art

Convertible amphibious aircraft are often used in areas where it may be necessary to land on water or on land as desired. The aircraft have landing gear or wheels which are extended when landing or taking off of land-based runways. For water landings, the landing gear is retracted. In flight, the landing gear is retracted to reduce air drag. Thus, there is not a right or a wrong retractable gear position for landing or takeoff. However, a convertible amphibious aircraft upon takeoff or landing from a land-based runway must have its retractable landing gear in a down position as with any aircraft.

A convertible amphibious aircraft must also, however, take off from water when its landing gear is folded within the fuselage, wings or pontoons. In these instances the landing gear is left in the retracted position during flight and never extended during that flight if, in fact, the flight terminates with another water landing.

On the other hand, an amphibious aircraft might takeoff from a water-based landing strip with its gear in the retracted position, leave the gear in the retracted position during the flight and then travel to a land-based runway. Serious injury to the occupants of the plane and extensive damage to the convertible amphibious plane occurs if a landing is attempted with the landing gear in an improper position for the landing surface. This risk is continually present, especially if the plane's route varies somewhat randomly between water-based and land-based runways. This is often the case if the pilot is stopping at a land-based runway, while the next stop on the pilot's itinerary might be a canal, river or lake. This problem is particularly seen in coastal areas where commercial activity is of a marine nature. Such a pilot might be landing at municipal airports which are land-based yet in the next few minutes may be landing aside work boats, barges, offshore oil platforms, or even a customer's facility which might have no landing strip but rather a dock for boats and seaplanes to approach for loading and unloading of personnel, cargo, and the like.

Repetitive stops during a day in marine or coastal areas can cause a pilot to forget the proper position of his retractable landing gear. In the past, this problem has plagued the amphibious aircraft industry.

Many types of warning and landing systems have been proposed for aircraft. In U.S. Pat. No. 2,262,756 a circuit in the aircraft actuated a warning device to warn the pilot that the retractable wheels were not extended only when the pilot was about to land and prevented the warning signal being falsely actuated at any other time as for instance when the throttle was closed during formation flight, dive bombing, fighting and the like.

U.S. Pat. No. 2,292,392 provided another safety device for use on aircraft employing retractable landing gears wherein a warning was issued when the aircraft was about to land and the wheels were not in the extended landing position for a land-based runway. In U.S. Pat. No. 2,420,066 a selector of gear position and an in-transit indicator of the landing gear position was provided, while a warning signal to indicate that the landing gear was projected was proposed in U.S. Pat. No. 2,738,490. U.S. Pat. No. 3,017,609 dealt with an apparatus to indicate air drag by being keyed to air speed. However, this apparatus did not warn of improper wheel position in an amphibious aircraft.

U.S. Pat. No. 3,161,852 related to an indicating device, especially for indicating the position of landing gear and the landing gear doors of airplanes. However, the device was primarily an indicator device, providing a warning keyed to throttle position.

The above devices did not solve the problem of prompting a decision from an amphibious aircraft pilot just prior to landing by asking the pilot to decide whether the landing about to be made is on water or land, and further indicating to the pilot that the retractable landing gear position is proper for the selected landing surface.

SUMMARY OF THE INVENTION

Briefly the present invention provides a pilot warning system for amphibious aircraft with retractable landing gear, including a prompting means for warning the pilot that the aircraft is in transition between a landing speed and a cruising speed, both on take off and landing. An input means is provided for indicating prior to landing whether the landing is to be on land or on water. An indicator means tells the pilot if the retractable landing gear is in a position corresponding to the designated landing surface.

In this manner, prior to any landing, the pilot must indicate the type of landing proposed at a time during transition from cruising speed to landing speed. When a water landing is intended and the landing gear are properly retracted, operations proceed. If a water landing is proposed and the landing gear are sensed to be extended, the pilot is alerted to this effect. If landing on a runway is expected, the pilot is alerted if the landing gear are not extended. Additionally, on take off, the pilot is alerted that the landing gear have moved to the proper retracted position.

BRIEF DESCRIPTION OF THE DRAWINGS

FIG. 1 is an isometric view of an indicator/display panel portion of the apparatus of the present invention; and FIGS. 2 and 3 are schematic electrical circuit diagrams of the apparatus of the present invention.

DESCRIPTION OF THE PREFERRED EMBODIMENT

Figure 3:
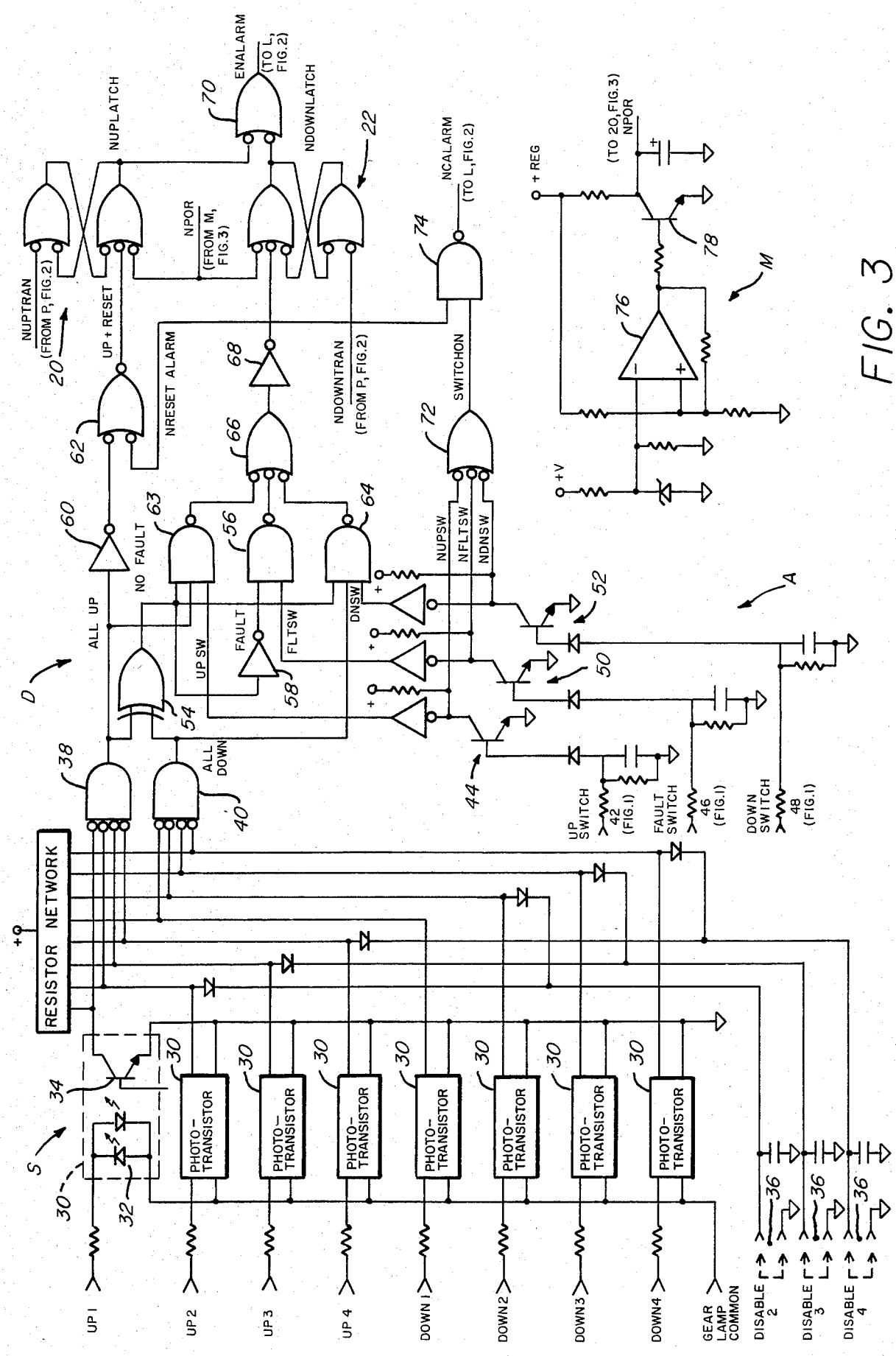

In the drawings, an apparatus for warning the pilot of a convertible amphibious aircraft to verify the status of landing gear of the aircraft is illustrated. As used in the present invention, convertible amphibious aircraft means amphibious aircraft having, in addition to the pontoons or floats or other structure permitting landing on bodies of water, retractable landing gear so that the aircraft may land on runways or other land surfaces. The apparatus A of the present invention warns the pilot of the aircraft of the status of the retractable landing gear when a prompting or warning circuit P warns the pilot that the aircraft is in transition to a state above or below a lower speed, which may be either a takeoff or landing speed, and a higher operating or cruising speed.

When warned of the transition in speed by the prompting circuit P (FIG. 2), the pilot designates through an input circuit I (FIG. 1) whether an expected landing is to be on land or water, and an alarm or indicating circuit L (FIG. 2) indicates to the pilot if the retractable landing gear is properly placed either up or down, depending upon the landing selected. The apparatus of the present invention further includes a sensor circuit S (FIG. 3) which senses the position of the aircraft landing gear and a decoding circuit D (FIG. 3) which provides the sensed position of the landing gear to the alarm circuit L (FIG. 2). The apparatus of the present invention further includes a power monitor circuit M (FIG. 3) which senses whether or not the power being furnished to the apparatus meets or exceeds the specified minimum acceptable power level for safe operation of the apparatus.

The prompting circuit P (FIG. 2) includes a pressure transducer 10 which forms an electrical output signal indicative of the present aircraft speed and furnishes such signal as an input signal to an up transition comparator amplifier 12 and down transition comparator amplifier 14. The amplifiers 12 and 14 compare the electrical input signal provided from the transducer 10 with adjustable threshold levels. The amplifier 12 is provided with adjustable threshold levels from a potentiometer 16 indicative of a transition speed up from a lower or takeoff speed to an upper or operating cruising speed. The threshold level established by potentiometer 16 may be adjusted as desired, depending upon the takeoff transition speed selected for the aircraft.

Similarly, amplifier 14 is provided with adjustable threshold levels from a potentiometer 18 varied as desired to establish a transition speed down from an operating speed to a landing speed for the aircraft with which the apparatus A is used. When the aircraft speed exceeds the threshold takeoff speed, the amplifier 12 furnishes an electrical signal indicative of this event to an UP latch circuit 20 of the decoding circuit D. Further, when the aircraft speed decreases below the threshold transition speed indicating a landing, the amplifier 14 furnishes an electrical signal indicative of the event to a DOWN latch circuit 22. Each of the latch circuits 20 and 22, on receipt of an electrical signal from the prompting circuit P, transfers to a state rendering the alarm circuit L active to notify the pilot that the aircraft has changed speed to that at which landing or acceleration to cruise is expected. The pilot must then select via input circuit I the desired landing gear position. If the actual landing gear position does not conform to the desired position, the pilot is alerted so that correction can be made.

A transistor 24 of prompting circuit P is electrically connected to a test switch 26 of the input circuit I over a conductor 28 so that the pilot may test the operation of the apparatus A under conditions simulating a transition to landing speed. The transistor 24 causes an electrical signal to be provided to the latch circuit 22 in a like manner to operation of the amplifier 14.

The decoding circuit D is electrically connected to receive electrical signals from the sensing circuit S which senses the position of the retractable landing gear on the aircraft. The sensing circuit S is electrically connected to conventional landing gear position sensing switches on the aircraft to sense the up or retracted condition and the down or extended position of each of the number of landing gear on the aircraft. Each of the up or down position sensors is electrically connected to an associated phototransistor circuit 30, typically including a photodiode pair 32 which emits light when the position sensor associated therewith is in the proper sensed position. The phototransistor circuit 30 also includes a phototransistor 34 which is rendered electrically conductive in response to receipt of light from the photodiodes 32 when the sensor in the landing gear associated therewith is in the proper position. The phototransistor circuits 30 electrically isolate the apparatus A from the position sensing circuitry of the aircraft and thus protect the circuitry of the apparatus A from electrical transients which may be present from time to time in the electrical system of the aircraft. Disable sockets 36 are provided for use in situations where the number of sensing phototransistors exceeds the number of landing gear position to be detected with the apparatus A.

The phototransistor circuit 30 associated with the landing gear up sensors are each electrically connected to provide an input signal to an up AND gate 38 of the decoding circuit D, while the phototransistors 30 associated with the landing gear down sensors are electrically connected to provide input signals to a down AND gate 40 of the decoding circuit D. In the event that all landing gear are detected as up by the sensor circuit S, the gate 38 forms an output signal which is provided to remaining portions of the decoding circuit D. Similarly, in the event that all landing gear are each detected as down by the sensor circuit S, the gate 40 forms an output signal which is provided to the remainder of the decoding circuit D.

An up switch 42 (FIG. 1) of the input circuit I is electrically connected to a transistor 44 in the decoding circuit D which is rendered conductive in the event that the pilot presses the switch 42. Similarly, a fault switch 46 and a down switch 48 are electrically connected through transistors 50 and 52, respectively, which are rendered electrically conductive in response to the switch associated therewith being depressed. Switch 42 is depressed by the pilot when the landing gear are desired up, while switch 48 is depressed for a landing gear down desired condition. Switch 46 is depressed when the pilot wishes to acknowledge that a fault condition had occurred. If a speed transit is detected and no action is desired it will require pressing the button that agrees with the gear position to cancel the alert. Each of the switches of input circuit I are provided with a lamp driven by the alarm circuit L.

The AND gates 38 and 40 of decoding circuit D are electrically connected to provide input signals to an EXCLUSIVE OR gate 54 for the purpose of detecting when both the up sensors and the down sensors are indicated to be on at time of a speed transition. If this is the case, a fault switch NAND gate 56 is enabled through an inverter 58, for reasons to be set forth below.

The AND gate 38 is electrically connected to provide an input signal through an inverter 60 to an up/reset gate 62 in the event that the sensing circuit S detects that each of the landing gear up sensors indicates that the landing gear is up. The output of gate 38 is also furnished to an up switch gate 63, while the output of the gate 40 is electrically connected to provide an input signal to a down switch gate 64 in the event that the sensing circuits S indicates that all of the down sensors for the aircraft landing gear are closed.

The up switch gate 62 is electrically connected to receive input signals from the gate 38 and the up switch 44, so that the pilot may, at the time of transition, indicate by depressing button 42 that it is desired to maintain the landing gear of the aircraft in the up position sensed in the sensors S and furnished through the gate 38. If, however, both the up and down landing sensors are concurrently activated, gate 54 inhibits the passage of any signal through the up switch gate 62. Instead, the pilot may on detecting from the landing gear indicator lamps that both the up and down sensors are active, depress the fault switch 46, closing transistor 50. Similarly, in the event that the landing gear down sensors signify to the sensor circuits S that all landing gear are in the down position, the pilot may indicate that it is desired to maintain the landing gear in this position by depressing the down switch 48, energizing transistor 52.

Depression of switch 42 or 48 on the input I at a time that the landing gear are sensed to be in the corresponding position or depression of the fault switch 46, as indicated by the gate 54, causes the switch gate associated therewith to transmit an electrical signal through a NOR gate 66 and inverter 68 resetting the down latch 22 and the up latch 20. When the latches 20 and 22 are in the reset position, a gate 70 at the output of the decoding circuit D blocks transition of a signal and inhibits activation of the alarm circuit L. Further, depression of any of the switches 42, 46 or 48 and activation of the respective transistors associated therewith in the decoding circuit D is transmitted through a switch ON gate 72 and a gate 74 as a further inhibition on operation of the alarm circuit L. The gate 74 is also electrically connected to the inverter 68 to inhibit the alarm circuit L.

The power monitor circuit M includes a comparator amplifier 76 receiving at a negative input terminal the voltage being provided to bias the electronic circuitry of the apparatus A. The amplifier 36 further is provided with a regulated operating threshold level at a positive input. In the event that the power supply voltage provided to the apparatus A goes below the operating threshold level, a transistor 78 is rendered conductive, setting the latches 20 and 22 to their set condition in a like manner to their being set by the priming circuit P in the manner set forth above, enabling the gate 70 to pass a signal to activate an oscillator 80 of the alarm circuit L.

The oscillator 80 of the alarm circuit L has a low frequency, such as less than ten hertz, so that output signals provided therefrom through an inverter 82 and gate 84 may activate a lamp drive transistor 86 and cause the lamps associated with the four switches of the input circuit I to flicker at a visually perceptible rate. Further, the signals formed in the oscillator 80 are provided through a drive transistor 88 which activates a horn or buzzer a rate corresponding to the rate of flashing of the lamps by the lamp drive circuit 86. The signals formed in the oscillator 80 are further provided by the gate 84 to an oscillator 90 which, during alternate half-cycles of the signal furnished from the oscillator 80 activates an oscillator 90 to provide a suitable audible frequency signal, such as one kilohertz. The bursts of audio frequency signal from the oscillator 90 are furnished through a buffer amplifier 92 and level adjusting potentiometer 94 to a headphone jack so that the pilot is provided with an audible indication that a check must be made of the status of the aircraft landing gear at the time of speed transition detected by the prompting circuit P.

If the transition detected is a decrease in speed, indicating that a landing is planned, the pilot indicates the intended landing surface by depressing the up switch 42 or the down switch 48 as the case may be. If the sensor circuit S has, however, detected a different position than that designated, the alarm formed in the alarm circuit L continues to sound and the pilot must adjust the position of the landing gear to correspond to the indicated position.

In the event that the transition detected by the priming circuit P is one of an increase in speed and the takeoff was from a landing strip or runway, the pilot is alerted by the flashing light 48 that the landing gear is not in an up position so that the pilot can raise the wheels or determine why they have not been previously retracted. At any time in flight, the pilot may verify the position of the landing gear by depressing switch 26. Alarm circuit L is activated and continues to sound until the switch 42 or 48, as the case may be, corresponding to the actual gear position is depressed.

The foregoing disclosure and description of the invention are illustrative and explanatory thereof, and various changes in the size, shape and materials, components, circuit elements, wiring connections and contacts, as well as in the details of the illustrated circuitry and construction may be made without departing from the spirit of the invention.

We claim:
1. An apparatus for warning the pilot of an amphibious aircraft with retractable landing gear of the status of the landing gear comprising:
   (a) prompting means for warning the pilot that the aircraft is in a speed transition;
   (b) input means for receiving an indication from the pilot designating, in response to said prompting means, whether a landing is selected to be on land or on water;
   (c) means for sensing the position of the landing gear;
   (d) alarm means for indicating to the pilot if the retractable landing gear is properly placed for the selected landing.
2. The apparatus of claim 1, further including:
   said prompting means including means for warning the pilot when the landing gear does not retract upon takeoff.
3. The apparatus of claim 1, further including:
   means for electrically isolating said means for sensing from said alarm means.
4. The apparatus of claim 1, further including:
   means responsive to said means for sensing landing gear position for indicating a fault condition when the landing gear is sensed to be concurrently in an up and a down position.
5. The apparatus of claim 1, further including:
   means responsive to said means for sensing landing gear position for indicating a fault condition when the landing gear is sensed to be concurrently not in either the retracted or the extended position.
6. The apparatus of claim 1, wherein said input means comprises:
   means permitting the pilot to verify the present position of the landing gear.
7. The apparatus of claim 1, further including:
   means for providing the sensed position of the landing gear to said means for indicating.
8. The apparatus of claim 1, wherein the apparatus is driven by an electrical power supply and further including:
   means for indicating a fault condition in response to a low power level in the power supply.

9. The apparatus of claim 1 wherein said prompting means comprises:
(a) means for sensing aircraft speed;
(b) means for comparing the sensed aircraft speed with a transition speed level; and
(c) means for indicating when the transition speed level is crossed.

10. The apparatus of claim 1, wherein said prompting means includes:
(a) means for sensing aircraft speed;
(b) means for comparing the sensed aircraft speed with a takeoff transition speed level; and
(c) means for indicating when the takeoff transition speed level is crossed.

11. The apparatus of claim 1, wherein said prompting means includes:
(a) means for sensing aircraft speed;
(b) means for comparing the sensed aircraft speed with a landing transition speed level; and
(c) means for indicating when the landing transition speed level is crossed.

* * * * *

UNITED STATES PATENT AND TRADEMARK OFFICE
CERTIFICATE OF CORRECTION

PATENT NO. : 4,516,124
DATED : May 7, 1985
INVENTOR(S) : Harry D. Shannon; William P. Lutts It is certified that error appears in the above-identified patent and that said Letters Patent are hereby corrected as shown below:

In the Abstract, Line 5:

please delete "is" and insert therefor --are--.

In Column 2, Line 26 and Line 41:

please delete "take off" and insert therefor --takeoff--.

Signed and Sealed this

Eighth Day of October 1985

[SEAL]

Attest:

DONALD J. QUIGG

Attesting Officer

Commissioner of Patents and
Trademarks—Designate